US012682782B2

(12) United States Patent
Corre et al.

(10) Patent No.: US 12,682,782 B2
(45) **Date of Patent: \*Jul. 14, 2026**

(54) METHOD AND DEVICE FOR RETRIEVING BIOMECHANICAL PARAMETERS OF A STRIDE

(71) Applicant: SLYDE ANALYTICS LLC, Houston, TX (US)

(72) Inventors: Jérôme Corre, Savières (CH); Steve Devènes, Riddes (CH); Frédéric Lamon, Corin-de-la-Crête (CH); Stefan Hochuli Paychère, Chigny (CH); Christophe Ramstein, Haute-Nendaz (CH)

(73) Assignee: Slyde Analytics LLC, Houston, TX (US)

( \* ) Notice: Subject to any disclaimer, the term of this patent is extended or adjusted under 35 U.S.C. 154(b) by 202 days.

This patent is subject to a terminal disclaimer.

(21) Appl. No.: 18/391,394

(22) Filed: Dec. 20, 2023

(65) Prior Publication Data

US 2024/0119860 A1    Apr. 11, 2024

Related U.S. Application Data

(62) Division of application No. 16/652,655, filed as application No. PCT/IB2018/056598 on Aug. 29, 2018, now Pat. No. 11,875,696.

(30) Foreign Application Priority Data

Aug. 29, 2017    (CH) ................................ CH01062/17

(51) Int. Cl.
    *A63F 9/24*        (2006.01)
    *A63B 24/00*      (2006.01)
    (Continued)

(52) U.S. Cl.
    CPC ...... *G09B 19/0038* (2013.01); *A63B 24/0003* (2013.01); *A63B 24/0062* (2013.01);
    (Continued)

(58) Field of Classification Search
    CPC ... G07F 17/32; G07F 17/3214; G07F 17/3222
    (Continued)

(56) References Cited

U.S. PATENT DOCUMENTS 9,873,018 B2    1/2018    Flaction et al.
2009/0018794 A1    1/2009    Meriheina
(Continued)

FOREIGN PATENT DOCUMENTS

EP        1862765 A1    12/2007
EP        1897598 A1    3/2008
(Continued)

OTHER PUBLICATIONS

International Search Report and Written Opinion for PCT/IB2018/056598 dated Nov. 22, 2018, 12 pages.

*Primary Examiner* — Adetokunbo O Torimiro
(74) *Attorney, Agent, or Firm* — Volpe Koenig

(57)        ABSTRACT

A method and device determine biomechanical parameters of a runner from an accelerometer worn off-torso on a wrist, upper arm, head, or shoe. Acceleration including a vertical component is acquired and cadence is determined from the initial sequence. At least one frequency component caused by relative motion of the device with respect to the runner's center of mass—comprising a fundamental at approximately one-half the cadence and one or more harmonics—is identified. A cadence-locked comb filter, whose notch center frequencies are functions of the cadence and that applies greater attenuation at the one-half-cadence fundamental and its harmonics than at the cadence fundamental, is applied to generate a modified acceleration sequence that approximates
(Continued)

FFT Magnitudes center-of-mass vertical acceleration. Biomechanical param-eters such as contact time, flight time, stiffness, undulation, and take-off or landing angle are then determined from the modified sequence.

20 Claims, 5 Drawing Sheets

(51) Int. Cl.
| | | |
|---|---|---|
| *A63F 11/00* | (2006.01) | |
| *G06F 3/01* | (2006.01) | |
| *G06F 13/00* | (2006.01) | |
| *G06F 17/00* | (2019.01) | |
| *G06N 20/00* | (2019.01) | |
| *G09B 19/00* | (2006.01) | |
| *G06V 10/42* | (2022.01) | |
| *G06V 40/20* | (2022.01) | |

(52) U.S. Cl.
CPC .............. *G06F 3/011* (2013.01); *G06F 3/017* (2013.01); *G06N 20/00* (2019.01); *A63B 2220/40* (2013.01); *A63B 2220/803* (2013.01); *G06V 10/431* (2022.01); *G06V 40/23* (2022.01)

(58) Field of Classification Search
USPC ................... 482/8; 463/1, 20, 22, 25, 39, 40
See application file for complete search history.

(56) References Cited

U.S. PATENT DOCUMENTS

| | | | | |
|---|---|---|---|---|
| 2013/0191034 A1* | 7/2013 | Weast | ..................... | G01P 15/00 |
| | | | | 702/19 |
| 2016/0213975 A1* | 7/2016 | Flaction | ............. | A63B 24/0006 |
| 2016/0361020 A1* | 12/2016 | LeBoeuf | ............. | A61B 5/6815 |

FOREIGN PATENT DOCUMENTS

| | | | |
|---|---|---|---|
| WO | WO-2009/094746 A1 | 8/2009 | |
| WO | WO-2011/157607 A1 | 12/2011 | |

* cited by examiner

METHOD AND DEVICE FOR RETRIEVING BIOMECHANICAL PARAMETERS OF A STRIDE

RELATED APPLICATIONS

This application is a Divisional of U.S. application Ser. No. 16/652,655, filed on Mar. 31, 2020, which is a national phase of PCT/IB2018/056598, filed on Aug. 29, 2018, which claims the benefit of Swiss Application No. 01062/17, filed on Aug. 29, 2017. The entire contents of these applications are hereby incorporated by reference.

FIELD OF THE INVENTION

The present invention relates to a method and to an accelerometer device provided with an accelerometer for retrieving biomechanical parameters of a stride.

DESCRIPTION OF RELATED ART

The results of a runner depend essentially on cardiovascular endurance qualities and on the mechanical efficiency of the stride. Many devices and tests are known in the state of the art for measuring progress in terms of cardiovascular performance. For example, many runners train with a heart rate monitor that shows them their heart rate at any time, whilst different tests enable for example the maximum oxygen volume taken from the lungs and used by the muscles per time unit ($VO_2$ max) to be measured.

The present invention relates more precisely to methods and devices for measuring the biomechanical efficiency of the stride. By improving the efficiency of each stride, the runner is able to run faster or longer with a given quantity of energy. It is however difficult, even for a runner accompanied by an experienced coach, to objectively measure the efficiency of his/her stride and improve it without resorting to measuring devices. In particular, there is a need for a method and device that are simple, portable, self-sufficient and capable of supplying, in real time and immediately after the run, parameters that are useful for analyzing the stride.

Wristwatches are also known that are provided with an inertial sensor. One example is described in EP1862765. The wrists of a runner, however, follow a very different trajectory from that of the athlete's center of mass and even briefly returns backward at each step. Such devices are possibly useful for approximately evaluating the distance travelled or the number of calories expended during a running session, but are however incapable of analyzing the stride accurately.

When worn at the wrist, the motion of the accelerometer device includes both the motion of the runner's center of mass, plus all other motions resulting from the runner's joints and musculo-skeletal deformation. Typically, these extra motions include the movement of the arm (including lower arm and upper arm movements, resulting from the elbow and shoulder joints), the flexion, extension and compression along the length of the spine, as well as the motion around the scapula (shoulder blade) and clavicle (collar bone). Studying those extra motions might be interesting, but does not provide much information on the efficiency with which a runner displaces his center of mass.

Different companies also suggest placing an accelerometer in or on the shoe. One example is described in WO09094746. This location enables the trajectory of one of the two feet to be followed very closely. It is however far removed from the runner's center of gravity and therefore does not make it possible to detect for example whether the runner's torso oscillates or sways unsuitably. Furthermore, this sensor ignores what the other foot is doing and does not allow for example the runner's flight time duration at each stride to be measured. It also does not allow the behavior of the center of gravity to be analyzed and does not therefore allow an accurate analysis of the stride.

EP1897598 describes a training aid device for different sports. It uses an accelerometer on the ankle or knees. Again, these different locations are removed from the athlete's center of gravity and from his plane of symmetry, so that the measurements supplied are inaccurate or not relevant for analyzing the running style.

A much more precise evaluation of the runner's efficiency can be achieved with an accelerometer placed close to the center of gravity of the runner, for example on his chest, torso or back. Such an accelerometer follows the displacement of the center of gravity of the runner and provide biomechanical parameters for analyzing the stride of a runner.

US20090018794 describes a device for measuring the progress of a moving person by means of an inertial sensor placed close to the center of gravity. The speed and the other parameters are determined on the basis of the maximum vertical acceleration or possibly of the minimum vertical acceleration by using a proportionality factor k. This factor k, which is not described in the document, depends however necessarily on the type of displacement, on the means of locomotion and on the running style; the computed results are thus equivocal or depend on unverifiable hypotheses about the factor k. The aim of this document is first and foremost to add indications obtained at each stride in order to display for example the travelled distance, the number of steps or the speed, but not to display parameters enabling the efficiency of each stride to be analyzed.

WO2011/157607, the contents of which is included by reference, is related to a method implementing an accelerometer for analyzing biomechanical parameters of the stride of a runner. The method uses a device with a triaxial accelerometer fastened on the torso of the runner, and a processor for calculating various parameters of the stride such as the lowering of the center of gravity, the stiffness, a regularity index, a fatigue level, and various other useful parameters.

Although much more accurate, accelerometer devices worn on the torso, chest or back are less comfortable since they usually require a belt or similar device to hold them. Therefore, they tend to be less popular than accelerometer devices worn on the wrist, on the head or on the shoe.

Therefore, there is a need for a method and device for determining biomechanical parameters of the stride of a runner with a high accuracy, using an accelerometer device on the wrist, on the head or on the shoe.

BRIEF SUMMARY OF THE INVENTION

According to the invention, these aims are achieved by means of a method according to claim 1, and by means of a device according to claim 17.

In one aspect, the invention is also related to a method for determining biomechanical parameters of the stride of a runner, using an accelerometer device on one wrist, on one upper arm, on the head or on one shoe, comprising the steps of measuring an initial sequence of acceleration data in at least the vertical direction using said accelerometer device;

extracting a sample window from said initial sequence of acceleration;

performing a FFT of said sample window, so as to compute a FFT signal;

inputting said FFT signal to a machine learning system, such as a neural network, in order to determine the current or predicted future cadence of the runner.

The expression "biomechanical parameters" designates parameters depending on trajectories, strength, power, speed or position of the musculo-skeletal system of the runner.

The expression "frequency component" could designate a specific frequency value, or a range of consecutive frequencies.

The attenuated frequency component might be constant over time, or variable over time. In one embodiment, the attenuated frequency component depends on the acceleration signal, for example on the running cadence.

The expression "attenuating a frequency component" includes for example filtering said frequency component out, or reducing the amplitude or energy of the portion of the acceleration signal within that range. The attenuation might be constant within the range, or variable within the range. In one embodiment, the attenuation depends on the acceleration signal, for example on the running cadence.

The expression "accelerometer device" designates any device provided with an embedded accelerometer, including devices used for self-assessment during sport activities.

BRIEF DESCRIPTION OF THE FIGURES

Examples of embodiments of the invention are indicated in the description illustrated by the attached figures in which.

DETAILED DESCRIPTION OF POSSIBLE EMBODIMENTS OF THE INVENTION

A device 1 according to the invention could be embedded in a wristwatch, in a smartphone, in a headset, in glasses etc. It generally comprises a case and mounting means for fastening it to the wrist, to the upper arm, to the shoe, etc.

Figure 4:
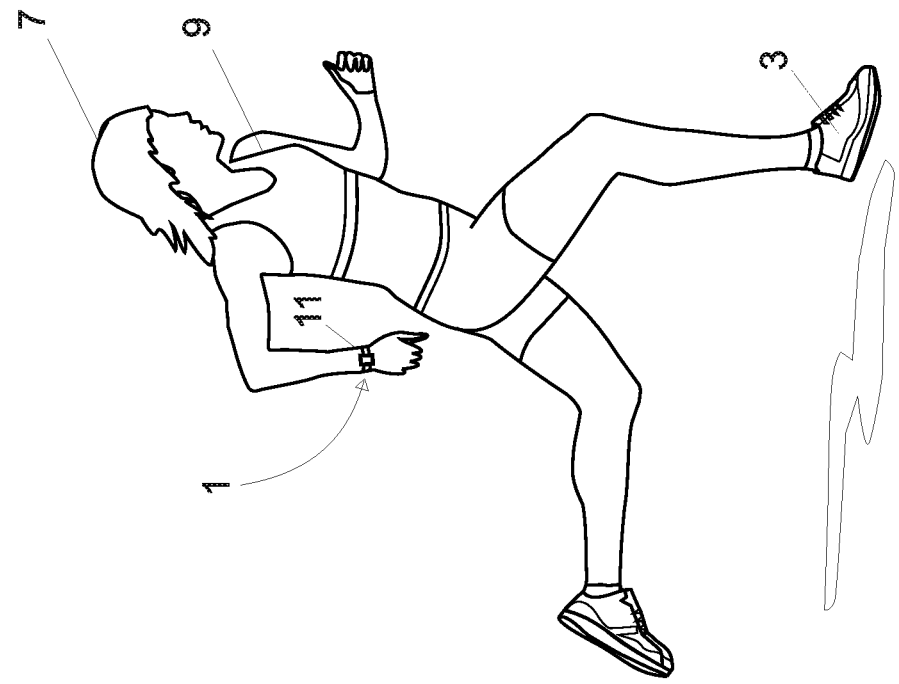
FIG. 4 illustrates a runner using one device according to one embodiment of the invention.
Figure 5:
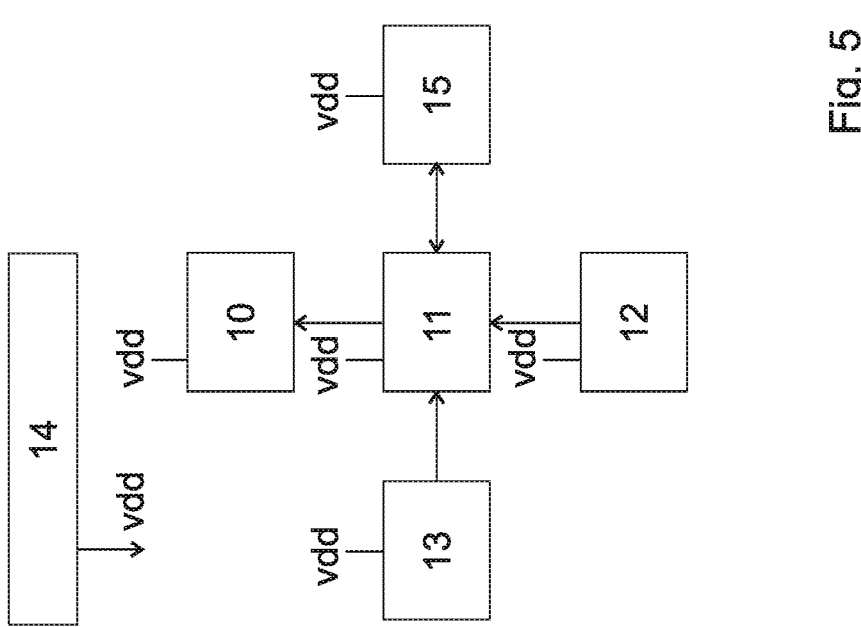
FIG. 5 is a block-diagram of one device according to one embodiment of the invention.

As illustrated on FIG. 4, the device 1 might comprise and accelerometer 12 and a display 10.

The accelerometer 12 and the display 10 might be included into one single element, such as a sportwatch.

Alternatively, the device 1 comprises one first element containing the accelerometer 12 and worn on one wrist, one shoe 3, on the head 7, on a T-shirt 9, etc, and a distinct second element, such as a smartwatch, a smartphone, a tablet, a computer, etc, that includes the display 10.

This display 10 makes it possible to display control menus, the memory status, the state of the battery, as well as numeric and qualitative parameters determined during and after the tests. Controls 13, such as buttons, a touch display, or other tactile elements, make it possible to navigate in the menus, to select options, to enter data and to select the results to be displayed.

The accelerometer 12 is preferably a triaxial accelerometer, for example an accelerometer based on a MEMS-type component, supplying distinct acceleration sequences along three normal axes. The orientation of the device and/or of the accelerometer relative to the runner is measured at standstill and thus enables the device-runner's frame of reference to be calibrated and transformed in order to measure accelerations in a frame of reference linked to the runner. In one variant embodiment, triaxial data of the accelerometer are projected and memorized along a single one of the axes or along two axes or along three axes. The accelerometer can have a privileged axis that affords a higher accuracy, resolution, range of measurement and/or frequency of acquisition than the other axes. This privileged axis has been advantageously oriented roughly vertically during a normal use, in order to improve the quality of the measurement in the vertical direction.

The device is preferably electrically self-sufficient and includes a battery 14, for example an accumulator charged through a USB connector or an appropriate charger. The battery 14 supplies all the components, including a microprocessor 11 or a microcontroller provided with a RAM and/or EEPROM memory. The microprocessor executes an EEPROM-memory program that can be updated via a USB or Bluetooth interface 15 for example, in order to control the display and to analyze the acceleration data supplied by the accelerometer. This program thus allows the computation means to be controlled in order to determine the biomechanical parameters of the stride on the basis of the sequences of acceleration data measured along one or several axes.

The device also includes a chronograph for measuring temporal durations $\Delta t$, as well as a loud-speaker or a buzzer, not represented, controlled by the microprocessor to generate alarms or sounds.

Figure 1:
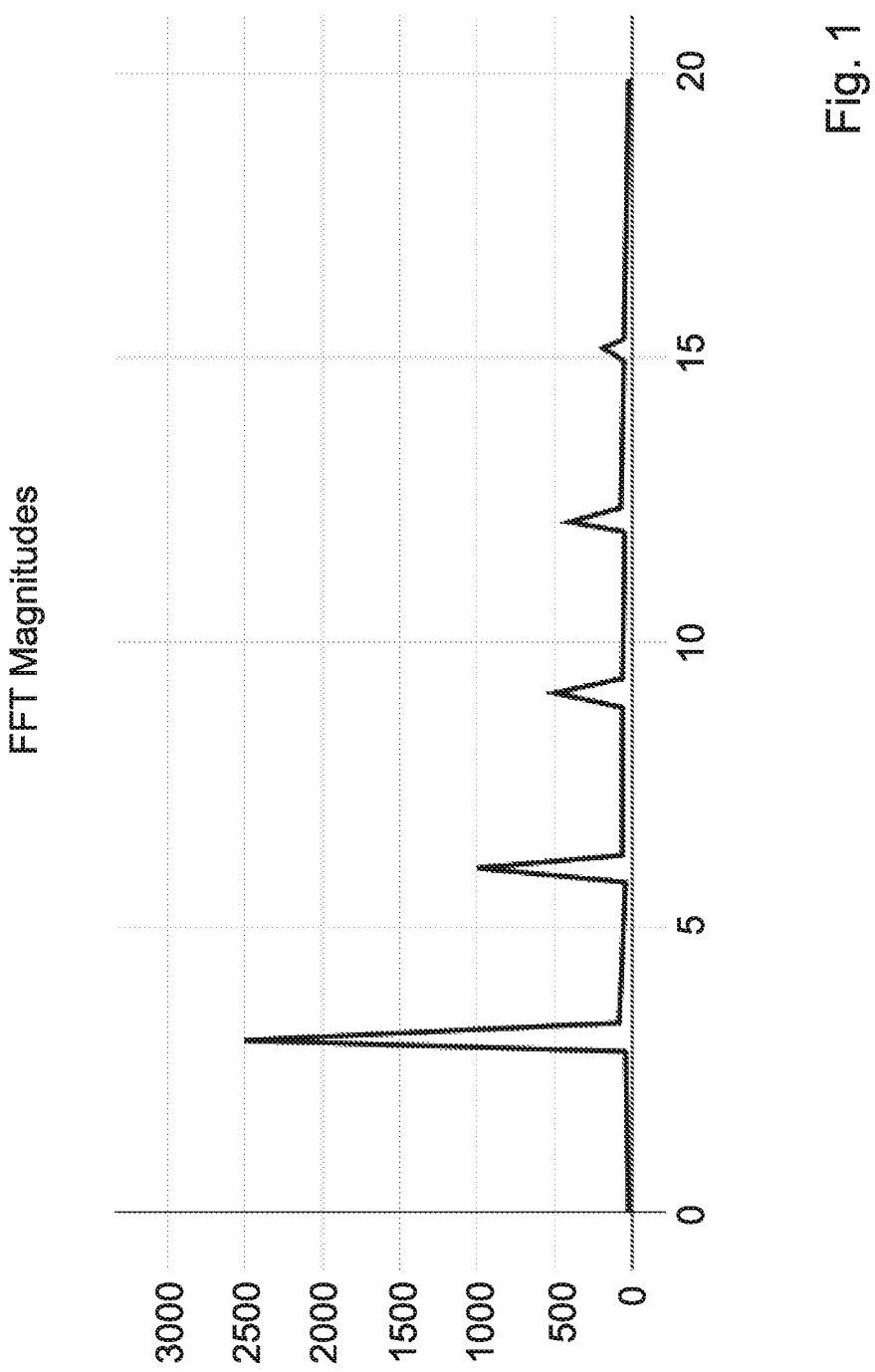
FIG. 1 illustrates an example of acceleration signal, in the frequency domain, measured with an accelerometer device close to the center of gravity.

FIG. 1 illustrates a sequence of acceleration data, in the frequency domain, measured with an accelerometer worn near the center of gravity, for example on the chest.

Figure 2:
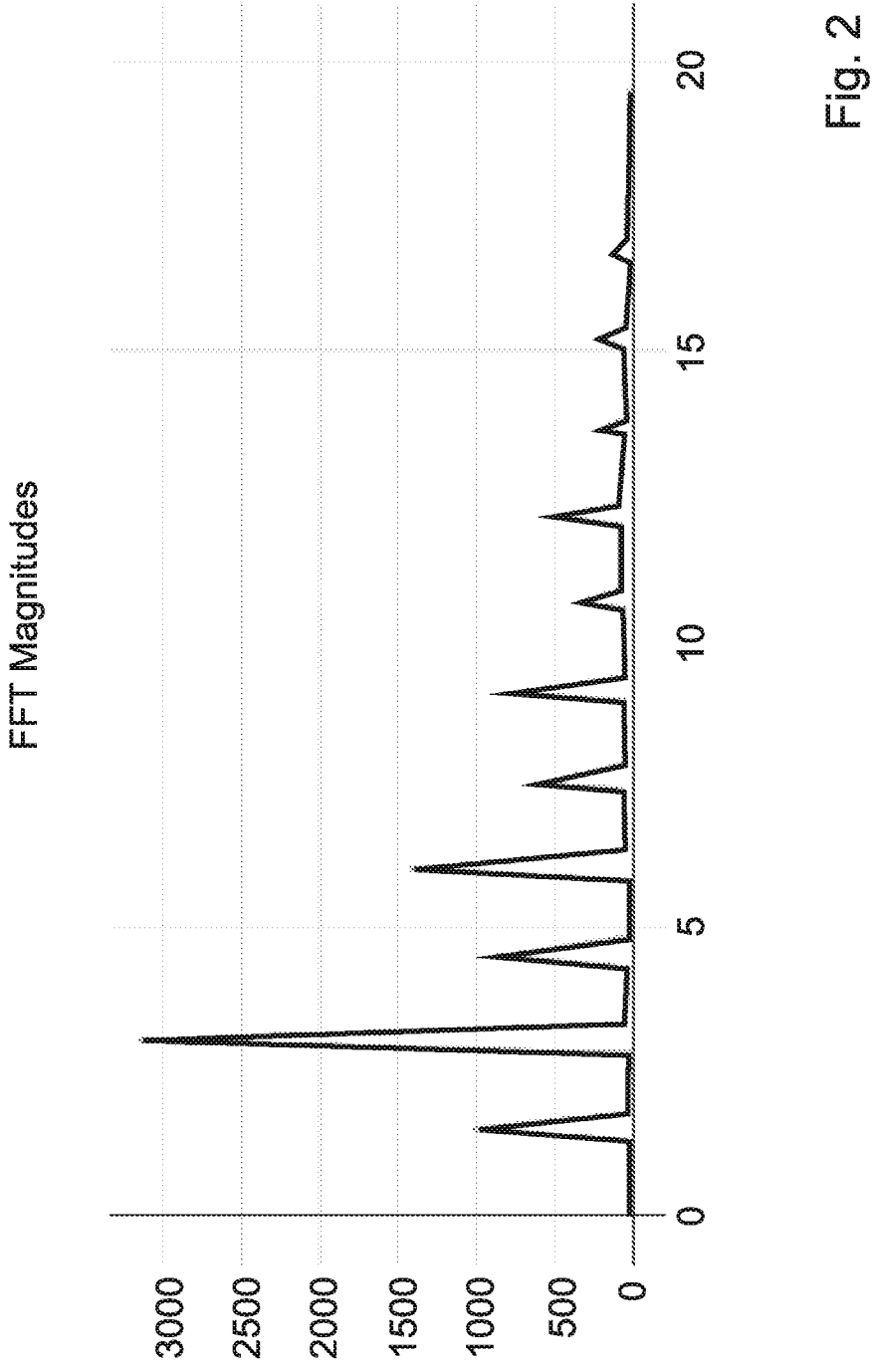
FIG. 2 illustrates an example of acceleration signal, in the frequency domain, measured with an accelerometer device on the wrist.

When worn at the wrist, the motion of the accelerometer device 1 includes both the motion of the runner's center of mass, plus all other motions resulting from the runner's joints and musculo-skeletal deformation. An example of acceleration data measured on the wrist is illustrated in the frequency domain on FIG. 2.

Typically, these extra motions include the movement of the arm (including lower arm and upper arm movements resulting from the elbow and shoulder joints), the flexion, extension and compression along the length of the spine, as well as the motion around the scapula (shoulder blade) and clavicle (collar bone).

A large collection of algorithms is available for determining biomechanical runners of a runner from sequences of acceleration data measured at or close to his center of mass. Those algorithms can't be used with sequences of acceleration data measured from the wrist (or shoe, of upper arm, or head), because the extra movements between the accelerometer device and the runner's center of mass would be detrimental.

Therefore, the following method is proposed to attenuate those extra movements and convert a sequence of acceleration measured at a wrist (or shoe, or upper arm, or head) into a modified sequence of acceleration at the runner's center of mass.

In a first step, at least one sequence of acceleration data is measured with the accelerometer device 1, such as a sportwatch, an accelerometer worn at the shoe, a smartphone worn on the upper arm, or an accelerometer embedded into a headset. The accelerometer is preferably worn remote from the center of mass of the runner, i.e., not on his chest, but rather on one limb or on his head.

The acceleration sequence could be measured with a triaxial accelerometer 12, and could correspond to one of the axis of the accelerometer. It is also possible to determine and use all three sequences of acceleration, corresponding to three axis. Alternatively, the three sequences are combined into one sequence, for example a sequence of acceleration along the vertical direction, and/or into three sequences, for example along the vertical, anteroposterior, and lateral directions relative to the runner. The sequences of acceleration might be filtered, for example using a low-pass or band filter, for example a software filter.

In a second step, a frequency corresponding to the cadency of the runner is determined. This frequency corresponds to the number of steps per second. This frequency might be determined by counting the number of steps during a predetermined period, using a step counting method known in the prior art. If multiple sequences of acceleration are determined, one of those sequences might be used for retrieving the cadence frequency. In one example, the acceleration along the vertical axis might be used for easily detecting the choc each time one foot touches the ground, and thus to determine the cadence frequency.

In a third step, a sample window is extracted from at least one sequence of acceleration data, and a Fast Fourier Transform (FFT) is applied to this (those) sample(s). For each sample, this produces a digital signal in the frequency domain, as illustrated on FIG. 2.

The most significant magnitude peak in each of those frequency signals is then extracted, and the device verifies that this peak corresponds to the previously determined cadence frequency. If the difference exceeds a threshold, the cadence frequency is recomputed.

Alternatively, the digital signal delivered by the FFT is input to a machine learning system, such as for example a neural network, in order to determine the cadence of the runner.

In another embodiment, the cadence frequency is determined only from the FFT(s), and there is no a priori determination of the cadence frequency with other means.

The cadence peak in the frequency signal has harmonics peaks. Peaks at different frequencies that the cadence peak and its harmonics denote the presence of other motion. Typically, the "arm swing" peak will be at half the frequency of the "cadence peak". The "arm swing" peak will also have harmonics, some of which will be superimposed on the "cadence" peak and its harmonics.

In the case of an accelerometer device 1 worn on the wrist 11, or on the upper arm, the extra motion is mainly related to "arm swing" at half the frequency of the cadence. The frequencies that correspond to the arm swing peak or its harmonics and do not overlay with the cadence peak are strongly attenuated with a filter in the frequency domain. The frequencies corresponding to the cadence peak and its harmonics are also attenuated, by an amount equivalent to the arm swing overlay.

Figure 3:
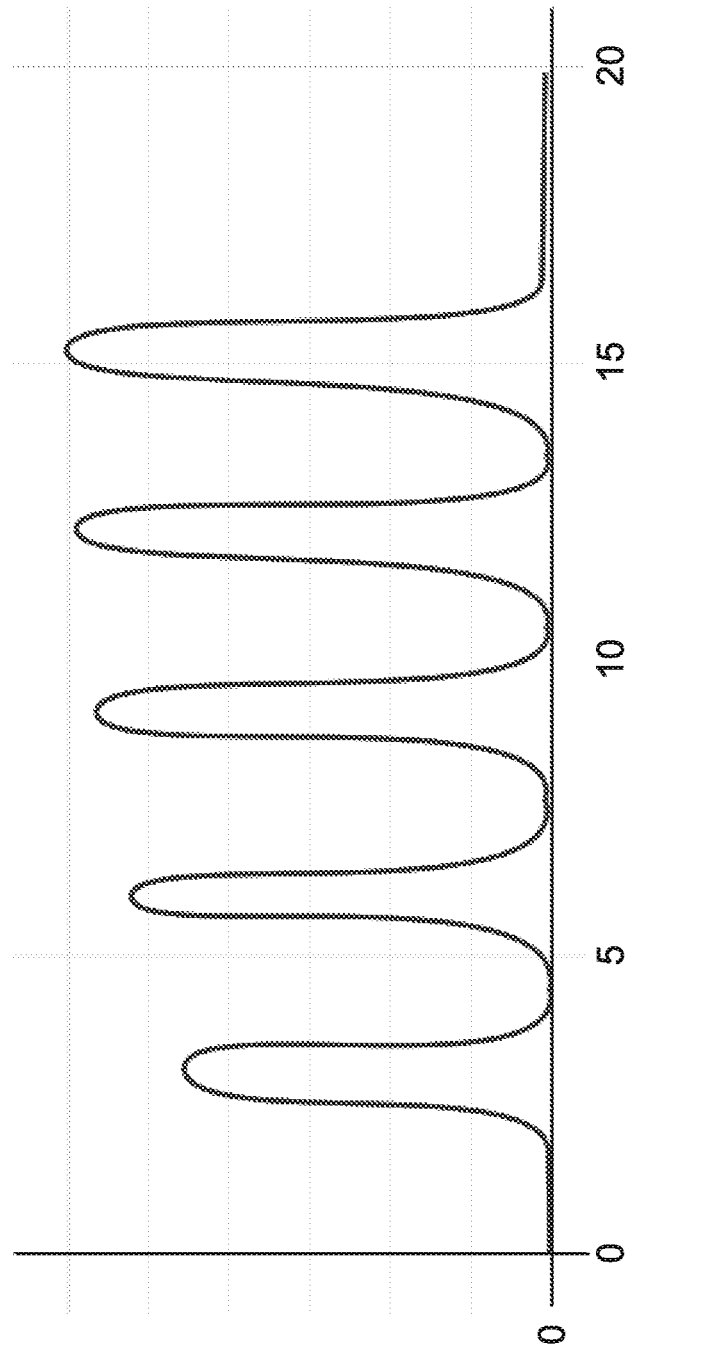
FIG. 3 illustrates an example of frequency response diagram of a filter that converts the signal measured on the wrist into a nearly equivalent signal measured at the center of gravity.

The filter is thus a comb filter, preferably a digital comb filter, such as a software comb filter. It provides an important attenuation of frequencies in a plurality of frequency ranges, and a less important attenuation outside of those frequency ranges. An example of frequency response of the filter is shown on FIG. 3.

The attenuation factor in each range (for each harmonic) is preferably determined in advance, and might be user-independent, although user dependent attenuation might be considered.

The comb filter determined during those steps is then used for subsequently filtering the continuous acceleration data sequences delivered by the accelerometer device. This generates one acceleration data signal, or a plurality of data acceleration signals along different directions, equivalent to the one that would be measured at the center of mass of the runner.

The attenuated frequencies are adapted during a run, for example periodically, and/or when the cadence frequency is modified (i.e. when the runner accelerates or decelerates), and/or in reaction to other triggers.

Given the center of mass signal(s), biomechanical running parameters are then computed using known methods, for example using the methods described in WO2011/157607.

The method can be implemented with minimal computing power requirement to run in real time on a processor embedded in the accelerometer device, for example in a wristwatch. This processor, along with the accelerometer embedded in the same wearable device, carry out all the above described steps.

Alternatively, the sequence of acceleration data might be transferred to a remote device, such as a smartwatch, a smartphone, a computer, a server, etc, that will perform the computations remotely.

The determination of extra motion performed with this method might be used to extract new biomechanical parameters, for example, relating to the arm movement in running.

The same method could be applied to an accelerometer device worn on the upper arm, for example a mobile phone held in a mobile phone holder on the upper arm. The only difference is that the extra motions do not include movement resulting from the elbow joint.

The same principle applies for a sensor worn on the head, typically using a headphone with embedded accelerometer or smart glasses. In this case, the extra motions do not include any motion from the shoulder or elbow joints, and instead includes movements from the neck joint. Head movements are usually low frequency signals, so filtering anything below the cadence peak would result in filtering out most of the head movement.

The invention claimed is:

1. A method for determining biomechanical parameters of a stride of a runner, the method comprising:

measuring an initial sequence of acceleration data in at least a vertical direction using an accelerometer device that is worn on a wrist, upper arm, head or shoe of the runner;

determining a cadence of the runner from the initial sequence of acceleration data;

identifying in the initial sequence of acceleration data at least one frequency component caused by relative motion of the accelerometer device relative to a center of mass of the runner, the at least one frequency component comprising a fundamental at approximately one-half the cadence and at least one harmonic thereof;

attenuating the frequency component, by applying a cadence-locked comb filter whose notch center frequencies are functions of the cadence and that applies greater attenuation at a one-half-cadence fundamental and its harmonics than at a cadence fundamental, so as to determine a modified sequence of acceleration data that approximates center-of-mass vertical acceleration; and determining the biomechanical parameters from the modified sequence of acceleration data.

2. The method of claim 1, wherein the identifying comprises:

extracting the cadence directly from the initial sequence of acceleration data; and using the cadence for determining the frequency component.

3. The method of claim 1, wherein the identifying further comprises:

extracting a sample window from the initial sequence of acceleration;

performing a FFT of the sample window to form a transformed signal; and determining the most significant frequency peak from the transformed signal.

4. The method of claim 2, further comprising:

verifying that the cadence determined directly from the initial sequence of acceleration data corresponds to a frequency peak.

5. The method of claim 2, wherein the identifying further comprises retrieving at least one harmonic peak from the cadence and/or from the most significant peak, and wherein the step of attenuating comprises attenuating the harmonic peak.

6. The method of claim 2, wherein the attenuating comprises attenuating frequencies at half the frequency of a cadence peak.

7. The method of claim 2, wherein the attenuating comprises attenuating frequencies at some harmonics of a cadence peak.

8. The method of claim 2, wherein the attenuating comprises attenuating a cadence peak by a first attenuation factor, and applying a greater attenuation to harmonics corresponding to an arm swing peak such that attenuation at the one-half-cadence fundamental and its harmonics is greater than attenuation at the cadence fundamental.

9. The method of claim 5, wherein frequencies between two attenuated harmonics are less attenuated than the harmonics.

10. The method of claim 1, further comprising:

extracting a sample window from the initial sequence of acceleration;

performing a FFT of the sample window, so as to compute a FFT signal; and inputting the FFT signal to a machine learning system, such as for example a neural network, in order to determine the cadence of the runner.

11. The method of claim 1, wherein the measuring is performed in a wristwatch, while the steps of identifying, attenuating and determining are performed in a smartphone or in a computer.

12. The method of claim 1, wherein the biomechanical parameters include at least one among:

flight time, contact time, lowering, elevation, undulation, asymmetry, regularity, reactivity, stiffness, take-off angle, and/or landing angle.

13. The method of claim 1, further comprising:

using the at least one frequency component caused by relative motion of the accelerometer device relative to the center of mass of the runner, in order to determine an arm movement.

14. The method of claim 1, the initial acceleration data being measured in a plurality of orthogonal directions, the attenuation being performed independently for each direction.

15. The method of claim 14, wherein the attenuated frequencies are the same for each direction.

16. A non-transitory computer product containing program code for causing a processor to execute the method of claim 1 when the code is executed.

17. The method of claim 1, further comprising validating the modified sequence of acceleration data by comparing a spectrum of the modified sequence to a stored center-of-mass spectral template and proceeding to determine the biomechanical parameters only when a similarity metric between the spectrum and the template exceeds a threshold.

18. An accelerometer device for determining biomechanical parameters of a stride of a runner with a high accuracy, comprising:

an accelerometer that measures an initial sequence of acceleration data in at least a vertical direction;

a memory; and one or more processors communicatively coupled to the accelerometer and the memory, wherein the one or more processors are collectively configured to:

identify in the initial sequence of acceleration data at least one frequency component caused by relative motion of the accelerometer device relative to center of mass of the runner, the at least one frequency component comprising a fundamental at approximately one-half the cadence and at least one harmonic thereof, attenuate the frequency component, by applying a cadence-locked comb filter whose notch center frequencies are functions of the cadence and that applies greater attenuation at a one-half-cadence fundamental and its harmonics than at a cadence fundamental, so as to determine a modified sequence of acceleration data that approximates center-of-mass vertical acceleration; and determine the biomechanical parameters from the modified sequence of acceleration data.

19. The accelerometer device of claim 18, further comprising:

a battery; and a display.

20. The accelerometer device of claim 18, wherein the one or more processors are further collectively configured to adaptively update notch center frequencies and bandwidths of the cadence-locked comb filter in response to a detected cadence change exceeding a threshold percentage of a current cadence.

* * * * *